(12) United States Patent
Denavit

(10) Patent No.: US 12,734,606 B2
(45) Date of Patent: Sep. 15, 2026

(54) METHOD FOR CALIBRATING A SENSOR FOR MONITORING A MELT POOL IN AN ADDITIVE MANUFACTURING MACHINE

(71) Applicant: ADDUP, Cebazat (FR)

(72) Inventor: Franck Denavit, Cebazat (FR)

(73) Assignee: ADDUP, Cebazat (FR)

( * ) Notice: Subject to any disclaimer, the term of this patent is extended or adjusted under 35 U.S.C. 154(b) by 323 days.

(21) Appl. No.: 18/578,771

(22) PCT Filed: Jul. 7, 2022

(86) PCT No.: PCT/FR2022/051368
§ 371 (c)(1),
(2) Date: Jan. 12, 2024

(87) PCT Pub. No.: WO2023/285752
PCT Pub. Date: Jan. 19, 2023

(65) Prior Publication Data

US 2024/0316690 A1 Sep. 26, 2024

(30) Foreign Application Priority Data

Jul. 12, 2021 (FR) ...................................... 2107539

(51) Int. Cl.
*B23K 26/03* (2006.01)
*B22F 12/90* (2021.01)
(Continued)

(52) U.S. Cl.
CPC ............ *B23K 26/032* (2013.01); *B22F 12/90* (2021.01); *B23K 26/034* (2013.01);
(Continued)

(58) Field of Classification Search
None
See application file for complete search history.

(56) References Cited

U.S. PATENT DOCUMENTS 9,167,179 B2 10/2015 Linsacum et al.
10,914,677 B2 2/2021 Gold et al.
(Continued)

FOREIGN PATENT DOCUMENTS

WO WO-2021015729 A1 * 1/2021 .............. B22F 12/90
WO 2021/080609 A1 4/2021

OTHER PUBLICATIONS

International Search Report dated Sep. 15, 2022, in corresponding PCT/FR2022/051368 (6 pages).

*Primary Examiner* — Erica S Lin
(74) *Attorney, Agent, or Firm* — VENABLE LLP

(57) ABSTRACT

A method for calibrating a sensor for monitoring a melt pool belonging to a system for monitoring a melt pool of an additive manufacturing machine comprises at least the following steps: measuring and recording the value of the signal transmitted by the monitoring sensor when it is not exposed to a reference radiation, exposing the monitoring sensor to the reference radiation, measuring and recording the value of the signal transmitted by this monitoring sensor when it is exposed to a reference radiation, calculating a correction coefficient for this monitoring sensor from a reference value associated with the reference radiation and the values of the signals, and recording in a correction table the correction coefficient for this monitoring sensor and the value of the signal transmitted by the monitoring sensor when it is not exposed to a reference radiation.

8 Claims, 4 Drawing Sheets

(51) Int. Cl.

| | |
|---|---|
| ***B23K 26/342*** | (2014.01) |
| ***B29C 64/386*** | (2017.01) |
| ***B33Y 50/00*** | (2015.01) |
| ***G01K 15/00*** | (2006.01) |
| *B23K 26/06* | (2014.01) |

(52) U.S. Cl.

CPC .......... *B23K 26/342* (2015.10); *B29C 64/386* (2017.08); *B33Y 50/00* (2014.12); *G01K 15/002* (2013.01); *G01K 15/005* (2013.01); *B23K 26/0604* (2013.01)

(56) References Cited

U.S. PATENT DOCUMENTS

| | | | |
|---|---|---|---|
| 11,338,390 | B2 | 5/2022 | Calta et al. |
| 2012/0211648 | A1 | 8/2012 | Linsacum et al. |
| 2019/0323951 | A1* | 10/2019 | Gold ...................... B33Y 50/02 |
| 2020/0254565 | A1 | 8/2020 | Calta et al. |
| 2022/0134669 | A1 | 5/2022 | Garcia Grau et al. |
| 2022/0227059 | A1 | 7/2022 | Borras Camarasa et al. |
| 2022/0324026 | A1* | 10/2022 | Beckett .................. B33Y 50/02 |

* cited by examiner

METHOD FOR CALIBRATING A SENSOR FOR MONITORING A MELT POOL IN AN ADDITIVE MANUFACTURING MACHINE

BACKGROUND

The present invention relates to the calibration of a sensor for monitoring a melt pool in an additive manufacturing machine, notably in a machine for additive manufacturing by powder bed deposition and selective melting.

Additive manufacturing by powder bed deposition and selective melting is an additive manufacturing method in which one or more part(s) is/are manufactured by the selective melting of various mutually superposed layers of additive manufacturing powder. The first layer of powder is deposited onto a support such as a platform, then selectively melted using one or more source(s) of energy or of heat along a first horizontal section of the one or more part(s) to be manufactured. Then, a second layer of powder is deposited on the first layer of powder which has just been consolidated, and this second layer of powder is then itself selectively consolidated, and so on up to the last layer of powder used for manufacturing the last horizontal section of the part(s) to be manufactured.

To ensure the quality of the manufactured parts and anticipate any malfunctions of the manufacturing means, additive manufacturing machines may be equipped with systems for monitoring the melt pool generated in each powder layer by the source or sources of energy or heat used for the selective melting. For example, a system for monitoring a melt pool comprises a sensor for measuring the thermal emission level of this melt pool.

In order to achieve accurate monitoring of the melt pool in an additive manufacturing machine, or to compare the results of the monitoring of the melt pool in a first machine with the results of the monitoring of the melt pool in a second machine, it is necessary to calibrate the sensor of the system for monitoring the melt pool of each machine.

Application US2019323951 proposes a method and a device for calibrating the melt pool monitoring system of an additive manufacturing machine.

In application US2019323951, the calibration device comprises a calibration platform 232 supporting a calibrated light source 240.

For the correct execution of the calibration method, the calibrated light source must be positioned very precisely in the machine and with respect to the sensor of the melt pool monitoring device. For this purpose, the calibrated light source is positioned very precisely on the calibration platform, and the calibration platform is positioned very precisely in the machine, notably by using positioning means 234, 236.

This essential precise positioning of the light source with respect to the sensor of the melt pool monitoring device is a first drawback of the calibration method and device described in application US2019323951.

This is because all the machines to be calibrated must allow the calibration platform to be accommodated, together with its positioning means, with the same precision with respect to the sensors of their own melt pool monitoring systems.

Consequently, only machines that are identical and allow the platform and its positioning means to be accommodated at a precise position can be calibrated with the calibration method and device described in application US2019323951.

After the precise positioning of the calibrated light source in the machine, the calibration method described in application US2019323951 provides for the exposure of the sensor of the monitoring system to a reference radiation emitted by the calibrated light source, the measurement of this reference radiation using the monitoring system, the comparison of the value measured by the monitoring system with a measured reference value, and the adjustment of the monitoring system so that it delivers a measured value identical to the measured reference value. For this adjustment step, provision is notably made for the modification of a physical gain, the optical focusing, the position of a filter, or an electronic gain, or even the replacement of a sensor.

This final adjustment step is a further drawback of the method described in application US2019323951, and may also prevent the use of this method in any type of machine. This is because the operations for adjusting the monitoring system may be difficult to implement or even impossible to execute, if the monitoring system is not designed for such adjustment, or if the means for providing these adjustment options cannot provide adjustment with sufficient resolution.

The object of the present invention is to provide a method for calibrating a sensor for monitoring a melt pool in an additive manufacturing machine which does not exhibit the aforesaid drawbacks.

SUMMARY

To this end, the invention proposes a method for calibrating a sensor for monitoring a melt pool belonging to a system for monitoring a melt pool of an additive manufacturing machine, the method comprising at least the following steps:

- measuring and recording the value of the signal transmitted by the monitoring sensor when it is not exposed to a reference radiation,
- exposing the monitoring sensor to the reference radiation,
- measuring and recording the value of the signal transmitted by this monitoring sensor when it is exposed to a reference radiation,
- calculating a correction coefficient for this monitoring sensor from a reference value associated with the reference radiation and the values of the signal transmitted by this monitoring sensor when it is not subjected to the reference radiation and when it is subjected to the reference radiation,
- recording in a correction table the correction coefficient for this monitoring sensor and the value of the signal transmitted by the monitoring sensor when it is not exposed to a reference radiation.

Advantageously, but not necessarily, the invention may also provide that:

- the correction table associated with a monitoring sensor is recorded in the system for monitoring a melt pool of which this monitoring sensor forms a part,
- if the electronic gain of the monitoring sensor is adjustable, this electronic gain is adjusted to a predefined value before the steps of measuring and recording the values of the signal transmitted by this sensor,
- the electronic gain of the monitoring sensor is set at its maximum before the steps of measuring and recording the values of the signal transmitted by this sensor,
- the reference radiation to which each monitoring sensor is exposed originates from a light source calibrated with respect to light intensity and wavelength, this calibrated light source comprising a filament lamp equipped with a device, such as a card, for adjusting its light output power.

Ideally, the method according to the invention is implemented with at least two different monitoring sensors, the method comprising at least the following steps:

- measuring and recording the value of the signal transmitted by each monitoring sensor when it is not exposed to a reference radiation,
- exposing each monitoring sensor to the reference radiation,
- measuring and recording the value of the signal transmitted by each monitoring sensor when it is exposed to a reference radiation,
- calculating a correction coefficient for each monitoring sensor from a reference value associated with the reference radiation and the values of the signal transmitted by this monitoring sensor when it is not subjected to the reference radiation and when it is subjected to the reference radiation,
- recording in a correction table the correction coefficient for each monitoring sensor and the value of the signal transmitted by each monitoring sensor when it is not exposed to a reference radiation.

If the method according to the invention is implemented with at least two different monitoring sensors, the invention may also provide that:

- the method is implemented with at least two monitoring sensors belonging to the same additive manufacturing machine,
- the method is implemented with at least two monitoring sensors belonging to separate additive manufacturing machines.

For example, the method according to the invention is applied to one or more sensors for monitoring a melt pool in one or more machines for additive manufacturing by powder bed deposition and selective melting.

BRIEF DESCRIPTION OF THE FIGURES

Further features and advantages of the invention will become apparent from the following description. This description, which is given by way of non-limiting example, refers to the appended drawings, in which.

DETAILED DESCRIPTION

The invention relates to a method for calibrating a sensor for monitoring a melt pool belonging to an additive manufacturing machine, such as a machine for additive manufacturing by powder bed deposition and selective melting.

Figure 1:
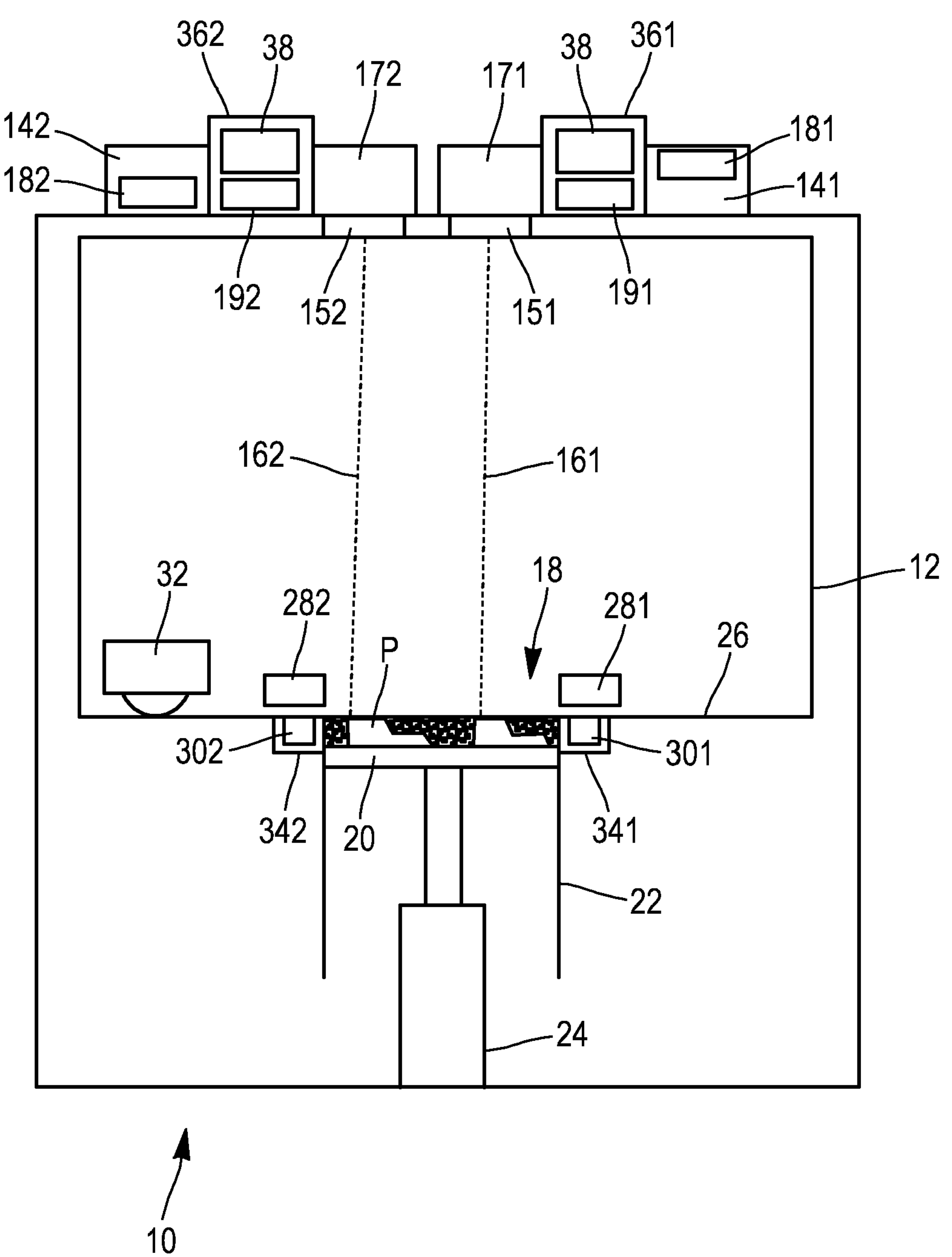
FIG. 1 is a schematic representation of an additive manufacturing machine in which the calibration method according to the invention may be implemented.

An example of a machine for additive manufacturing by powder bed deposition and selective melting is illustrated in FIG. 1.

An additive manufacturing machine 10 may comprise a build chamber 12 and two laser sources 141, 142, each emitting a laser beam 161, 162, for selectively melting a layer of an additive manufacturing powder deposited inside the build chamber 12. The laser sources are mounted on the outside of the build chamber, and windows 151, 152 allow the laser beams to pass through the top wall of the build chamber.

To allow the selective melting of each powder layer, each laser source 141, 142 is equipped with a scanning head 171, 172 comprising mechanical and optical means, such as various optical lenses and at least one mirror, for moving a laser beam and controlling its focusing inside the build chamber.

The build chamber 12 is a closed chamber which may be filled with an inert gas such as nitrogen. Advantageously, provision may be made for inert gas circulation in the build chamber, for the purpose of evacuating fumes produced by the melting of the powder and cooling the gas or gases circulating in the build chamber.

Inside the build chamber 12, the additive manufacturing machine 10 comprises at least one working area 18, defined by a build platform 20 and a build jacket 22, the platform 20 being moved in the jacket 22 by an actuator 24 such as a jack.

The build chamber 12 comprising a work surface 26, the jacket 22 extends vertically under the work surface 26 and opens into the work surface 26 through an opening made in the latter.

In order to produce the various layers of powder used for the additive manufacturing of the parts P to be manufactured, the machine comprises means for depositing a layer of powder.

In the machine illustrated by way of example in FIG. 1, these means for depositing a powder layer comprise two powder distributors 281, 282 connected to at least one powder reservoir (not illustrated) and two powder receiving sliders 301, 302 located on either side of the work area 18, together with a powder spreading device 32 that may take the form of a roller or a scraper. Advantageously, the sleeves 341, 342 housing the sliders may also be used for recovering excess deposits of powder.

In order to produce a layer of powder on the working area 18, a line of powder is delivered by a distributor on to a slider, and the spreading device then spreads the powder on the working area 18. For the deposition of the line of powder, a slider moves translationally under the distributor with which it is associated.

For the purpose of implementing monitoring of the melt pools generated by the beams 161, 162 of the two laser sources 141, 142, the machine 10 may comprise a system for monitoring a melt pool 361, 362 associated with each laser source.

Figure 2:
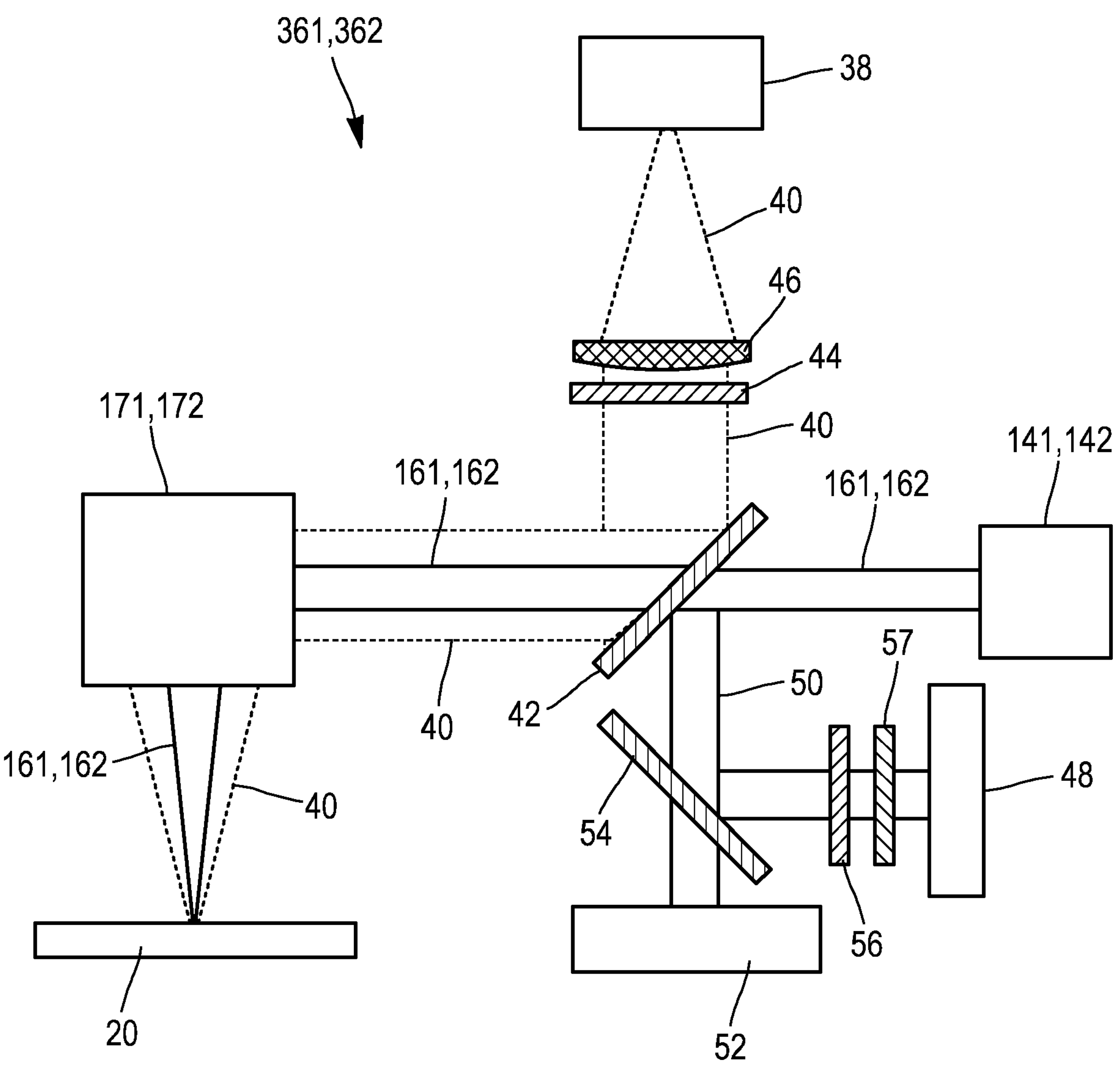
FIG. 2 is a schematic representation of a system for monitoring a melt pool in an additive manufacturing machine.

As illustrated in FIG. 2, a system for monitoring a melt pool 361, 362 comprises at least one melt pool monitoring sensor 38.

A system for monitoring a melt pool 361, 362 is placed between the laser source 141, 142 and its scanning head 171, 172. Thus the laser beam 161, 162 emitted by a laser source passes through the monitoring system before entering the scanning head 171, 172 associated with this source.

After passing into the scanning head, the laser beam 161, 162 selectively melts the powder layer present on the build platform 20.

When a melt pool is generated by the laser beam, the powder emits radiation, part of which 40 travels back towards the laser source 141, 142 via the optical means of its scanning head. It is this part 40 of the radiation emitted by the powder that is measured by the melt pool monitoring sensor 38. For this purpose, a first semi-reflective mirror 42 is positioned on the path of the laser beam between the laser source 141, 142 and its scanning head 171, 172, so as to allow the laser beam to pass from the laser source towards its scanning head, and so as to redirect the part 40 of the radiation emitted by the melted powder back towards the laser source and towards the monitoring sensor 38. For example, this first semi-reflective mirror 42 is positioned at 45° to the axis of propagation of the laser beam between the laser source and its scanning head.

For example, the melt pool monitoring sensor 38 is a thermal sensor. For example, the melt pool monitoring sensor 38 is a thermal sensor of the photodiode type. In a variant, the melt pool monitoring sensor 38 may take the form of a pyrometer or an optical, hyperspectral or infrared camera.

For example, when it is exposed to radiation, the monitoring sensor 38 delivers a signal related by a linear function to the colour temperature of this radiation. Additionally, when it is exposed to radiation having a given colour temperature, the monitoring sensor 38 also delivers a signal related by a linear function to the light power of this radiation.

For example, the monitoring sensor 38 delivers a voltage signal.

To improve the measurement made by the monitoring sensor 38, an optical filter 44 and a converging lens 46 may be positioned on the optical path followed by the part 40 of the radiation emitted by the powder between the semi-reflective mirror 42 and the monitoring sensor.

Advantageously, a system for monitoring a melt pool 361, 362 may also comprise a sensor for sensing the power 48 of the laser beam. This power sensor 48 uses the beam 50 reflected by the first semi-reflective mirror 42 when the laser beam emitted by the laser source passes through this mirror. A beam absorber 52 and a second semi-reflective mirror 54 may be placed between the first semi-reflective mirror 42 and the power sensor 48, in order to absorb some of the reflected beam 50 and reduce the load on the power sensor 48. An optical filter 56 and a diffuser 57 may also be fitted between the second semi-reflective mirror 54 and the power sensor 48.

This power sensor 48 may take the form of a photodiode or a thermopile.

In general terms, the present invention proposes a method for calibrating a melt pool monitoring sensor in an additive manufacturing machine, For example, the calibration method according to the invention is applied to a machine 10 for additive manufacturing by powder bed deposition and selective melting, to a system for monitoring a melt pool 361, 362, and to a monitoring sensor 38, as described above.

For its implementation, this calibration method comprises, notably, a step of exposing the monitoring sensor 38 to a reference radiation originating from a calibrated light source 58.

For the best possible exposure of the monitoring sensor 38 to the reference radiation originating from the calibrated light source 58, this calibrated light source must be positioned precisely within the build chamber 12 of the machine.

Instead of providing for the precise positioning of the calibrated light source with respect to the build platform and to the frame of the machine by highly precise mechanical assembly, the invention provides for the positioning of the calibrated light source within the additive manufacturing machine by means of a laser aiming beam which is different from the laser beam used to generate the melt pool.

In other words, the calibrated light source 58 is not dependent on the additive manufacturing machine. This calibrated light source is a device independent of the additive manufacturing machine, and may be moved freely within the build chamber of this machine by the operator responsible for the calibration.

Figure 3:
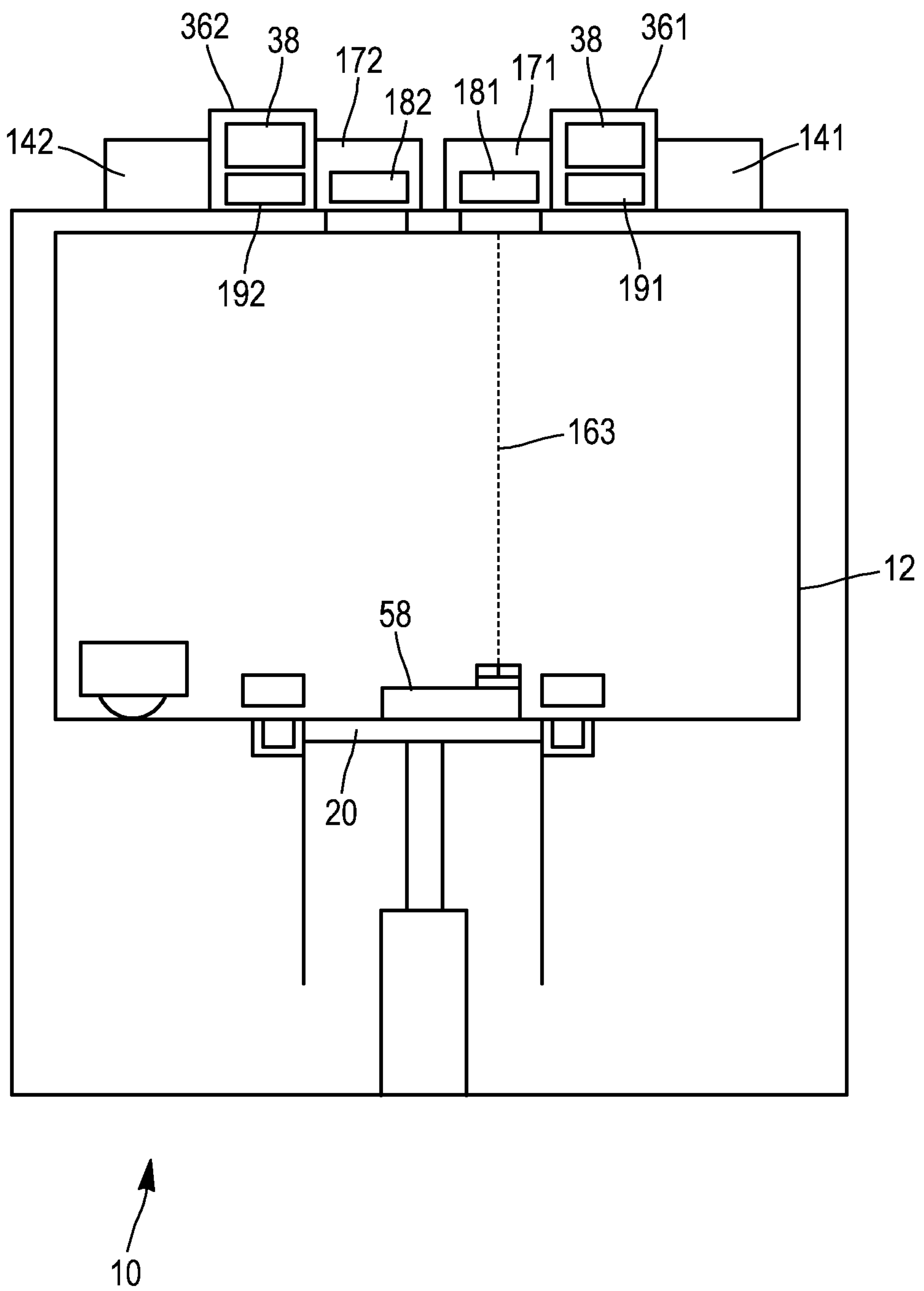
FIG. 3 illustrates the positioning of a calibrated light source in an additive manufacturing machine in conformity with the calibration method according to the invention.

As illustrated in FIG. 3, and as provided by the invention, the calibrated light source 58 is placed on the build platform 20 and positioned on this platform using a laser aiming beam 163 which is different from the laser beam 161, 162 used to generate the melt pool.

In greater detail, the laser aiming beam 163 is visible to the naked eye of an operator, and poses no danger to an operator. The laser aiming beam 163 has a wavelength of between 400 nm and 700 nm, being equal to 633 nm for example, so as to form a red spot on the surface or material at which it is directed. The positioning of the calibrated light source 58 in the build chamber 12 is carried out by an operator, using this red spot.

The laser aiming beam 163 is perfectly coaxial with the laser beam 161, 162 used to generate the melt pool. For this purpose, the laser source 181, 182 generating the laser aiming beam 163 is integrated into the laser source 141, 142 generating the laser beam 161, 162 used to generate the melt pool, or into the scanning head 171, 172 associated with the laser source 141, 142 generating the laser beam 161, 162 used to generate the melt pool.

Ideally, in order to eliminate any error that may have been caused by the scanning head, when the calibrated light source 58 is positioned in the build chamber 12, the laser aiming beam 163 is directed by the scanning head towards the point of origin of the reference frame associated with this scanning head. For example, during this positioning of the calibrated light source 58 in the build chamber 12, the laser aiming beam 163 is directed in a vertical direction under the scanning head and towards the working area 18.

To assist the operator in positioning the calibrated light source 58 in the build chamber 12, the calibrated light source 58 may be equipped with a removable sighting target 60. This sighting target 60 is placed on an optical output element 62 through which the reference radiation issues from the calibrated light source.

When the calibrated light source 58 has been positioned, and in order not to interfere with the emission of the reference radiation, this sighting target 60 is removed in the step of exposing the monitoring sensor 38 to the reference radiation emitted from the calibrated light source.

The sighting target 60 is mainly opaque over its whole surface, and is pierced at a sighting point 64 located in its centre. The sighting target is, for example, made of frosted glass. In greater detail, the sighting point is a circular hole with a diameter of between 0.5 and 1 mm.

Figure 4:
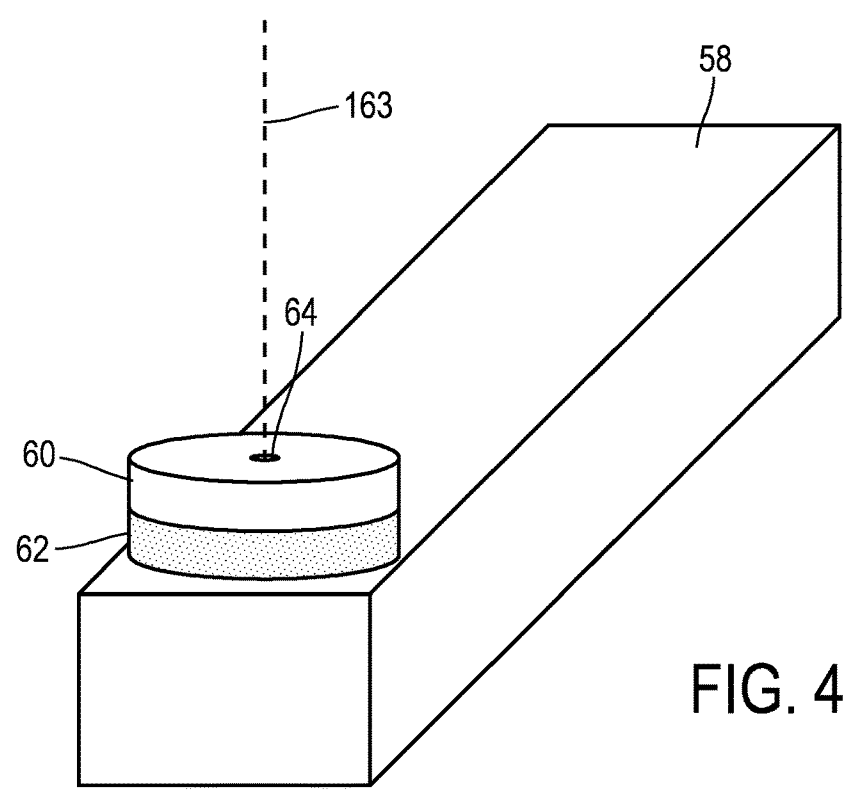
FIG. 4 is a detail view of the positioning of a calibrated light source in an additive manufacturing machine in conformity with the calibration method according to the invention.

During the positioning of the calibrated light source 58 in the build chamber 12, the operator moves the light source so that the spot of the laser aiming beam, in the form of a red dot for example, coincides with the sighting point. In greater detail, when the light source is correctly positioned in the build chamber 12, the spot of the laser aiming beam disappears in the hole forming the sighting point, as illustrated in FIG. 4.

Figure 5:
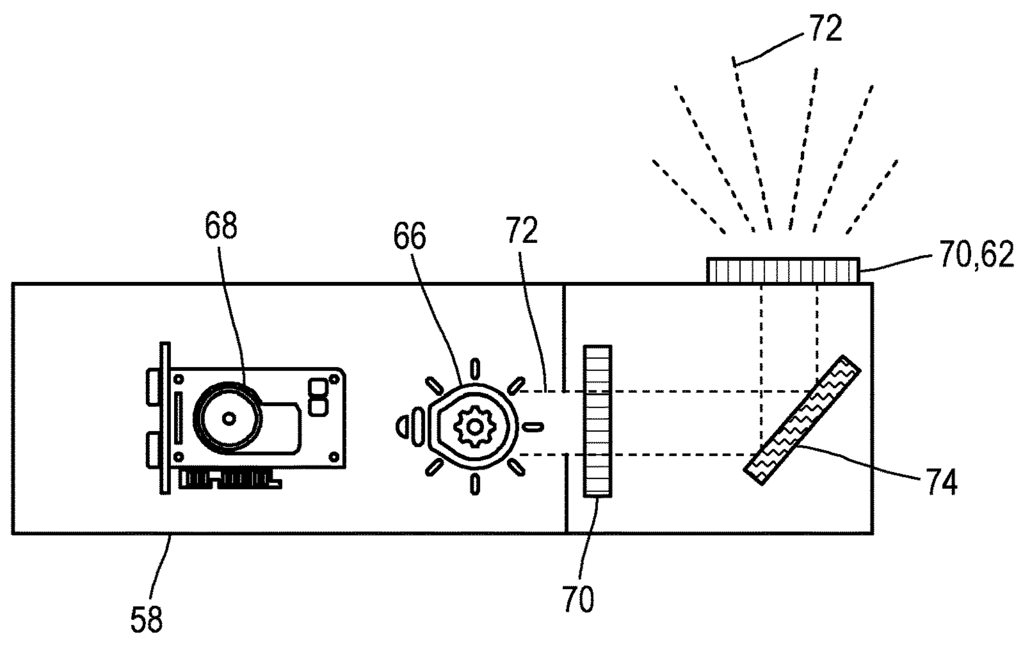
FIG. 5 is a schematic representation of the components of a calibrated light source that may be used in the calibration method according to the invention.

A calibrated light source 58 that can be used in the calibration method according to the invention is illustrated in FIG. 5.

This calibrated light source 58 is a light source calibrated with respect to its light intensity and wavelength. In greater detail, this calibrated light source 58 may comprise a filament lamp 66 equipped with a device 68, such as a card, for adjusting its light output power.

Advantageously, a filament lamp is less dangerous to handle than a black body emitter which heats up considerably, and provides a greater emission surface area than LED laser sources which require more complicated shaping of their light beams.

For example, the filament lamp 66 is a tungsten filament lamp.

The calibrated light source 58, via the filament lamp 66, emits a radiation whose colour temperature is preferably 2796 K, with a variation of plus or minus 15 K, and is therefore substantially equivalent to that of black body radiation.

For example, the light output power of the calibrated light source 58 is adjusted around a nominal value with a variation of less than 0.05% of this nominal value.

The calibrated light source 58, via the filament lamp 66, emits a reference radiation whose wavelength is between 360 and 2500 nm, and whose radiation peak corresponds substantially to the emission spectrum of the radiation emitted by the melt pool that is to be measured by the monitoring sensor 38 during a manufacturing cycle, for example between 1200 and 1700 nm.

To improve the uniformity of the reference radiation, the calibrated light source 58 may be equipped with at least one optical diffuser 70.

In the example illustrated in FIG. 5, the reference radiation 72 emitted by the filament lamp 66 passes through a first diffuser 70, is then reflected at 90° by a mirror 74 positioned at 45°, and finally passes through a second diffuser 70 which is also the optical output element 62 through which the reference radiation 72 issues from the calibrated light source. The two diffusers 70 and the mirror 74 form part of the calibrated light source 58.

Also for the purpose of improving the uniformity of the reference radiation, a collimator (not shown) may be placed between the filament lamp 66 and the first diffuser 70.

The calibrated light source 58 used in the present invention is an inexpensive and highly compact solution. Furthermore, this calibrated light source 58 is a tool that is easy to carry, to a customer's premises for example, and easy to use.

Because of this calibrated light source 58 which is independent of the machine, and because of its positioning in the machine by means of the laser aiming beam, the calibration method according to the invention may be used with any type of additive manufacturing machine that uses a laser beam to generate a melt pool and has a laser aiming beam.

According to another advantage, the calibration method according to the invention requires no adjustment of a melt pool monitoring sensor to make it deliver a measured value identical to a measured reference value when the sensor of this monitoring system is exposed to a reference radiation.

According to the invention, the method comprises at least the following steps for the purpose of calibrating a melt pool monitoring sensor 38 belonging to a melt pool monitoring system of an additive manufacturing machine 10:

- measuring and recording the value of the signal transmitted by the monitoring sensor 38 when it is not exposed to the reference radiation 72,
- exposing the monitoring sensor to the reference radiation 72,
- measuring and recording the value of the signal transmitted by this monitoring sensor when it is exposed to a reference radiation,
- calculating a correction coefficient for this monitoring sensor from a reference value associated with the reference radiation and the values of the signal transmitted by this monitoring sensor when it is not subjected to the reference radiation and when it is subjected to the reference radiation,
- recording in a correction table the correction coefficient for this monitoring sensor and the value of the signal transmitted by the monitoring sensor 38 when it is not exposed to a reference radiation 72.

For example, the reference value associated with the reference radiation 72 is a unitless value representative of both the light power of this reference radiation and the colour temperature of this reference radiation.

For the calculation of the correction coefficient, it is assumed that the monitoring sensor 38 transmits a signal related by a linear function to the colour temperature of the radiation to which it is exposed, and that, when the monitoring sensor 38 is exposed to a radiation having a given colour temperature, the monitoring sensor 38 also delivers a signal related by a linear function to the light power of this radiation.

Additionally, the calculation of the correlation coefficient also takes into account a background noise that may be measured by the monitoring sensor when it is not exposed to the reference radiation.

Thus, when it is exposed to the reference radiation, the value Y of the signal transmitted by the monitoring sensor is related to the reference value X associated with the reference radiation by the following relation: $Y=a \cdot X+b$, where a is the correction coefficient associated with this sensor and b is the measurement deviation due to the background noise measured by the sensor when it is not exposed to the reference radiation.

The calibration method according to the invention is intended to determine the correction coefficient a and the measurement deviation b for each monitoring sensor. These two values a and b are stored in the correction table for each monitoring sensor calibrated by the method according to the invention, and are used via linear interpolation during the monitoring of a melt pool to correct the value of the signal transmitted by each sensor, and to make it match a corrected value which is unitless and representative of both the light power of the radiation of the melt pool being monitored and the colour temperature of the radiation of this melt pool being monitored.

To determine the measurement deviation b, a measurement is made of the signal transmitted by the monitoring sensor when it is not exposed to the reference radiation, preferably with the build chamber 12 of the machine closed and the calibrated light source switched off or placed outside the build chamber.

To determine the correction coefficient a, the monitoring sensor is exposed to the reference radiation with which the reference value X is associated, and the value Y transmitted by this monitoring sensor when it is exposed to this reference radiation is used, the measurement deviation b of this monitoring sensor having been measured in advance, the correction coefficient a is given by the following relation: $a=(Y-b)/X$.

Since the calibrated light source 58 is chosen so that its peak radiation substantially matches the emission spectrum of the radiation emitted by the melt pool to be monitored, the unitless reference value X may be freely chosen. However, it must be chosen in a way that facilitates the reading and display of the values transmitted by the monitoring sensor or sensors, via software and on a monitoring screen, for example.

For example, the correction table associated with a monitoring sensor is recorded in the melt pool monitoring system of which this monitoring sensor forms a part. Where a melt pool monitoring system comprises a data acquisition card 191, 192, the correction table of the monitoring sensor or sensors of this monitoring system is, for example, stored on this data acquisition card.

Advantageously, the correction coefficient associated with a monitoring sensor is calculated by the data acquisition card of the monitoring system of which this monitoring sensor forms a part.

Advantageously, the calibration method according to the invention may be implemented with a melt pool monitoring system, and notably with a melt pool monitoring sensor, which has no capacity for adjustment, in relation to the sensor gain for example.

If the electronic gain of the monitoring sensor is adjustable, the calibration method according to the invention provides for the adjustment of this electronic gain to a predefined value before the steps of measuring and recording the values of the signal transmitted by this sensor. For example, the electronic gain of the monitoring sensor 38 is adjusted to its maximum before the steps of measuring and recording the values of the signal transmitted by this sensor. However, if the monitoring sensor provides a sufficient signal level when it is adjusted to its minimum gain, the electronic gain of the sensor may be left at its minimum value, in order to maximize the measurement bandwidth of the sensor.

The calibration method according to the invention is more particularly intended to be implemented with a variety of monitoring sensors.

According to a first example, the calibration method may be implemented with at least two monitoring sensors belonging to the same additive manufacturing machine.

According to a second example, the calibration method may be implemented with at least two monitoring sensors belonging to separate additive manufacturing machines.

According to a third example, the calibration method may be implemented in a plurality of additive manufacturing machines, each comprising a plurality of melt pool monitoring sensors.

In these various situations, the method comprises the following steps for the calibration of at least two melt pool monitoring sensors 38:

- measuring and recording the value of the signal transmitted by each monitoring sensor 38 when it is not exposed to a reference radiation 72,
- exposing each monitoring sensor to the reference radiation 72,
- measuring and recording the value of the signal transmitted by each monitoring sensor when it is exposed to a reference radiation,
- calculating a correction coefficient for each monitoring sensor from a reference value associated with the reference radiation and the values of the signal transmitted by this monitoring sensor when it is not subjected to the reference radiation and when it is subjected to the reference radiation,
- recording in a correction table the correction coefficient for each monitoring sensor and the value of the signal transmitted by each monitoring sensor 38 when it is not exposed to a reference radiation 72.

Finally, as mentioned at the beginning of the description, the calibration method according to the invention is particularly intended for application to one or more sensors for monitoring a melt pool in one or more machines for additive manufacturing by powder bed deposition and selective melting.

The invention claimed is:

1. A method for calibrating a monitoring sensor for a melt pool in a melt pool monitoring system of an additive manufacturing machine, the method comprising at least the following steps:

- measuring and recording a value of a signal transmitted by the monitoring sensor when the monitoring sensor is not exposed to a reference radiation;
- exposing the monitoring sensor to the reference radiation;
- measuring and recording a value of the signal transmitted by the monitoring sensor when the monitoring sensor is exposed to the reference radiation;
- calculating a correction coefficient for the monitoring sensor from a reference value associated with the reference radiation and the values of the signals transmitted by the monitoring sensor when the monitoring sensor is not subjected to the reference radiation and when the monitoring sensor is subjected to the reference radiation; and
- recording in a correction table the correction coefficient for the monitoring sensor and the value of the signal transmitted by the monitoring sensor when the monitoring sensor is not exposed to the reference radiation,
- wherein an electronic gain of the monitoring sensor is adjustable, and the electronic gain is adjusted to a predefined value before the steps of measuring and recording the values of the signals transmitted by the monitoring sensor.

2. The method according to claim 1, wherein the correction table associated with the monitoring sensor is recorded in the melt pool monitoring system of which the monitoring sensor forms a part.

3. The method according to claim 1, wherein the electronic gain of the monitoring sensor is set at a maximum before the steps of measuring and recording the values of the signals transmitted by the monitoring sensor.

4. The method according to claim 1, wherein the reference radiation to which the monitoring sensor is exposed originates from a light source calibrated with respect to a light intensity and a wavelength, and the calibrated light source comprises a filament lamp equipped with a device for adjusting a light output power.

5. The method according to claim 1, wherein the method is implemented with at least two different monitoring sensors, the method comprising at least the following steps:

- measuring and recording the value of the signal transmitted by each monitoring sensor when each monitoring sensor is not exposed to a reference radiation;
- exposing each monitoring sensor to the reference radiation;
- measuring and recording the value of the signal transmitted by each monitoring sensor when each monitoring sensor is exposed to a reference radiation;
- calculating a correction coefficient for each monitoring sensor from a reference value associated with the reference radiation and the values of the signals transmitted by each monitoring sensor when each monitoring sensor is not subjected to the reference radiation and when each monitoring sensor is subjected to the reference radiation; and recording in the correction table the correction coefficient for each monitoring sensor and the value of the signal transmitted by each monitoring sensor when each monitoring sensor is not exposed to the reference radiation.

6. The method according to claim 5, wherein the method is implemented with at least two monitoring sensors belonging to the same additive manufacturing machine.

7. The method according to claim 1, wherein the method is implemented with at least two monitoring sensors belonging to separate additive manufacturing machines, the method comprising at least the following steps:

measuring and recording the value of the signal transmitted by each monitoring sensor when each monitoring sensor is not exposed to respective reference radiations;

exposing each monitoring sensor to the respective reference radiations;

measuring and recording the value of the signal transmitted by each monitoring sensor when each monitoring sensor is exposed to the respective reference radiations;

calculating a correction coefficient for each monitoring sensor from a reference value associated with each respective reference radiation and the values of the signals transmitted by each monitoring sensor when each monitoring sensor is not subjected to the respective reference radiations and when each monitoring sensor is subjected to the respective reference radiations; and recording in the correction table the correction coefficient for each monitoring sensor and the value of the signal transmitted by each monitoring sensor when each monitoring sensor is not exposed to the respective reference radiations.

8. The method according to claim 1, wherein the method is applied to one or more sensors for monitoring a melt pool in one or more machines for additive manufacturing by powder bed deposition and selective melting.

* * * * *